(12) United States Patent
Hu et al.

(10) Patent No.: US 10,941,653 B2
(45) Date of Patent: Mar. 9, 2021

(54) APPARATUS, SYSTEM, AND METHOD FOR DOWNHOLE IMAGING USING A NON-ROTATABLE IMAGING TOOL HAVING A RADIATION DETECTOR

(71) Applicant: Halliburton Energy Services, Inc., Houston, TX (US)

(72) Inventors: Yike Hu, Phoenix, AZ (US); James E. Galford, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/314,325

(22) PCT Filed: May 15, 2018

(86) PCT No.: PCT/US2018/032707
§ 371 (c)(1),
(2) Date: Dec. 28, 2018

(87) PCT Pub. No.: WO2018/236492
PCT Pub. Date: Dec. 27, 2018

(65) Prior Publication Data
US 2020/0182052 A1 Jun. 11, 2020

Related U.S. Application Data

(60) Provisional application No. 62/522,483, filed on Jun. 20, 2017.

(51) Int. Cl.
*E21B 49/00* (2006.01)
*E21B 47/00* (2012.01)
(Continued)

(52) U.S. Cl.
CPC ............ *E21B 49/00* (2013.01); *E21B 47/002* (2020.05); *G01V 5/12* (2013.01)

(58) Field of Classification Search
CPC ........ E21B 47/002; E21B 47/09; E21B 49/00; G01V 5/12
See application file for complete search history.

(56) References Cited

U.S. PATENT DOCUMENTS

| 5,205,167 A | 4/1993 | Gartner et al. |
| 2011/0204216 A1 | 8/2011 | Moake et al. |

(Continued)

FOREIGN PATENT DOCUMENTS

| WO | WO-2015112118 A1 * | 7/2015 | ............. G01V 5/125 |
| WO | 2016144355 A1 | 9/2016 | |

*Primary Examiner* — Mark R Gaworecki
(74) *Attorney, Agent, or Firm* — John W. Wustenberg; Parker Justiss, P.C.

(57) ABSTRACT

A non-rotatable, downhole imaging tool, an imaging system including the non-rotatable imaging tool and methods of determining information about a wellbore employing the non-rotatable imaging tool are provided herein. One example of a non-rotatable imaging tool is disclosed that has a central axis and horizontal planes perpendicular to the central axis, and further includes: (1) a radiation detector positioned proximate the central axis and uniquely on one of the horizontal planes, and (2) a collimator configured to limit exposure of the radiation detector to a single azimuthal area along a circumference of the downhole imaging tool on the one of the horizontal planes.

20 Claims, 7 Drawing Sheets

(51) Int. Cl.
*G01V 5/12* (2006.01)
*E21B 47/002* (2012.01)

(56) References Cited

U.S. PATENT DOCUMENTS

2013/0105678 A1    5/2013   Wilson et al.
2015/0090870 A1    4/2015   Stoller

* cited by examiner

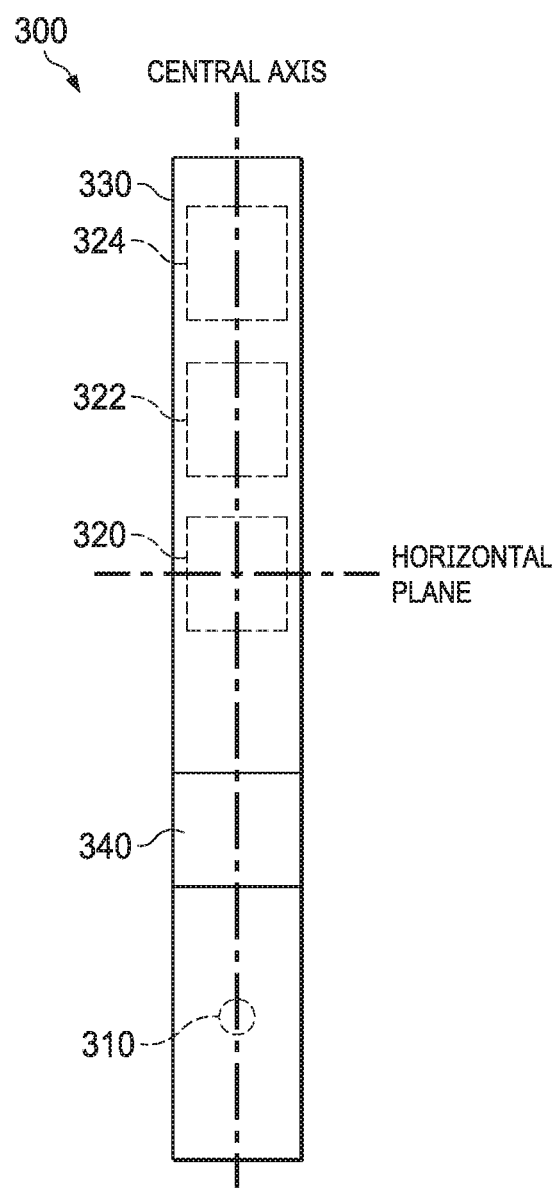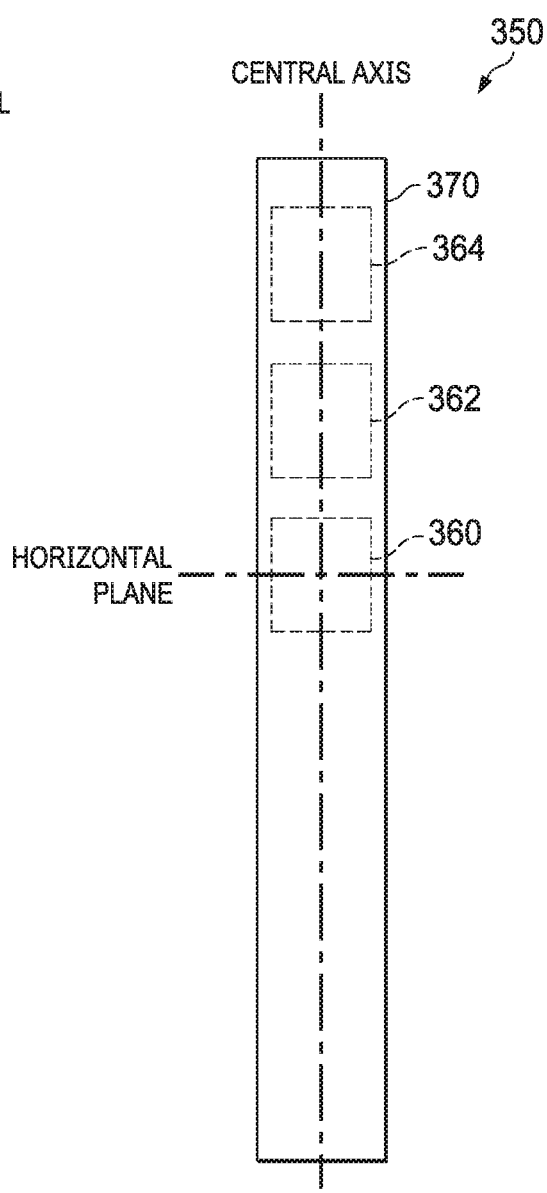
FIG. 3A
FIG. 3B

APPARATUS, SYSTEM, AND METHOD FOR DOWNHOLE IMAGING USING A NON-ROTATABLE IMAGING TOOL HAVING A RADIATION DETECTOR

CROSS-REFERENCE TO RELATED APPLICATION

This application is the National Stage of, and therefore claims the benefit of, International Application No. PCT/US2018/032707 filed on May 15, 2018, entitled "APPARATUS, SYSTEM, AND METHOD FOR DOWNHOLE IMAGING USING A NON-ROTATABLE IMAGING TOOL HAVING A RADIATION DETECTOR," which claims benefit of U.S. Provisional Application Ser. No. 62/522,483 filed on Jun. 20, 2017, entitled "APPARATUS AND METHOD FOR DOWNHOLE IMAGING USING A NON-ROTATABLE TOOL INSIDE SMALL WELLBORE WITH GAMMA RAY DETECTOR." The above applications are commonly assigned with this National Stage application and are incorporated herein by reference in its entirety.

TECHNICAL FIELD

This application is directed, in general, to an imaging tool that obtains imaging data in a wellbore and, more specifically, to obtaining imaging data inside a small wellbore.

BACKGROUND

A downhole logging tool for imaging utilizes either a rotating drilling tool or azimuthally distributed sensors to collect information from the circumferential area. A rotating tool requires a motor to drive the motion of the entire tool string. Azimuthally distributed sensors require placing multiple detectors at the same depth, which demands sufficient space inside a tool for the detector placement. When the tool has to be placed inside production tubing or pushed through drill pipe, there is a limit to the diameter of the tool. In particular, logging tools based on nuclear measurement principles require substantial real estate to accommodate detector(s) with a minimum sensor size.

BRIEF DESCRIPTION OF DRAWINGS

Reference is now made to the following descriptions taken in conjunction with the accompanying drawings, in which:

FIG. 3A illustrates a diagram of a side view of an example of an active non-rotatable imaging tool that measures radiation in a wellbore;

FIG. 3B illustrates a diagram of a side view of an example of a passive non-rotatable imaging tool that measures radiation in a wellbore;

DETAILED DESCRIPTION

Figure 1:
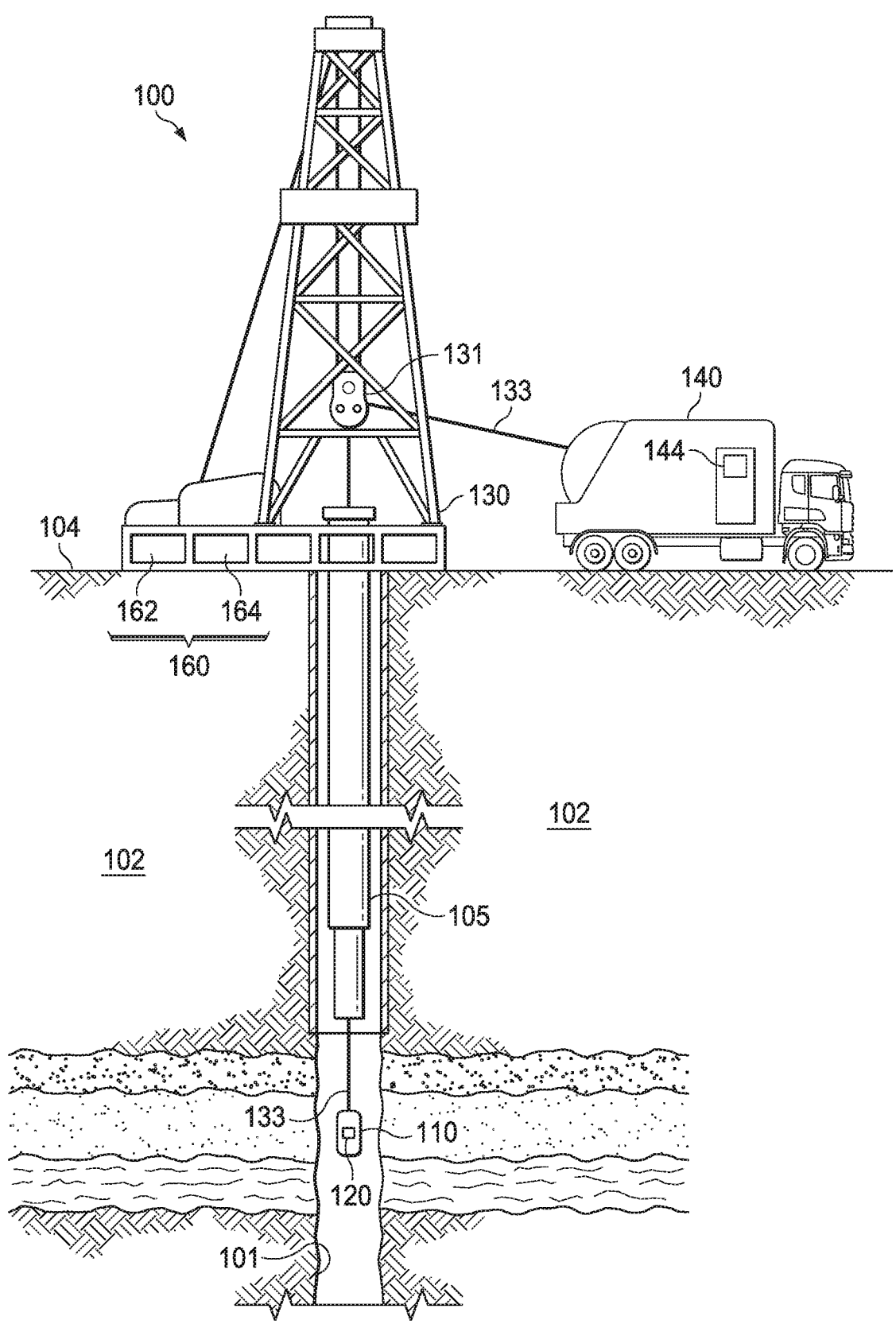
FIG. 1 illustrates a wireline system configured to perform, for example, formation testing, sampling, or downhole imaging of a wellbore.

This disclosure provides an apparatus, a downhole imaging tool, that generates image logs without rotating the downhole imaging tool and without multiple sensors azimuthally placed on the same horizontal plane of the downhole imaging tool. Thus, the non-rotatable imaging tool disclosed herein can be advantageously employed without requiring a motor to rotate the imaging tool and when there is insufficient space to have multiple nuclear measurement sensors azimuthally at the same depth in a wellbore. Non-rotatable as used herein does not indicate that the imaging tool cannot be rotated. For example, the non-rotatable imaging tool can be rotated as a consequence of the natural rotation of the tool caused by torque relief in the conveyor when the imaging tool is lowered into or removed from a wellbore. Non-rotatable as used herein indicates that the imaging tool is not intentionally rotated when operated in a wellbore, such as to obtain radiation measurements in a wellbore for 360 degree imaging. In addition to the disclosed non-rotatable imaging tool, a system for downhole imaging using the non-rotatable imaging tool is also provided. The non-rotatable imaging tool utilizes at least one nuclear measurement (or radioactive) detector and may or may not contain a nuclear (or radioactive) source. The radiation detector can be a gamma ray detector and the radioactive source can be a gamma radiation source. Other examples of a radiation source include a chemical neutron source, such as an americium beryllium neutron emitting source, or a pulsed neutron source, such as a switchable neutron source. A neutron generator is an example of a switchable neutron source. If a neutron source is employed, a gamma ray detector could still be used to capture gamma rays resulting from neutron interactions. Hereinafter, a gamma ray detector and gamma radiation source can be used in the disclosure as an example of a radiation detector and a radiation source.

The non-rotatable imaging tool can have multiple radiation detectors but each one is uniquely located on a different horizontal plane of the non-rotatable imaging tool. A radiation detector that is uniquely located or positioned on a horizontal plane as used herein is defined as the only radiation detector located or positioned on that horizontal plane. Thus, if the non-rotatable imaging tool has a single gamma ray detector or multiple such detectors each one is on a different horizontal plane of the imaging tool. Additionally, the radiation detector or detectors can be proximate, including located on, a central axis of the imaging tool. The horizontal planes or axes of the non-rotatable imaging tool are perpendicular to the central axis thereof.

The images obtained from the non-rotatable imaging tool can be used for various operations at a wellbore, such as, determining the structural dip of formations, determining tubular flaws, directional drilling monitoring, and determining the integrity of a well material, such as cement. A computer or processor can be programmed to process imaging data received from the radiation detector or detectors to provide the images to use for the well operations. The images may be used by a wellsite engineer or operator to control a well operation. In some embodiments, the processed images may be used automatically by a computer program to control a well operation. The computer or processor can be located at the surface and the imaging data can be communicated thereto from the non-rotatable imaging tool via a conventional medium used in wellbores, such as a wireline cable. The imaging data, or image log having the imaging data, can be stored in a memory, such as a non-transitory memory, of the non-rotatable imaging tool and downloaded when returned to the surface. In some embodiments, the computer or processor can be located in the non-rotatable imaging tool and perform some or all of the processing of the imaging data downhole.

The disclosed non-rotatable imaging tool provides an improved way to collect imaging data in a wellbore and provide images for various well operations. The non-rotatable imaging tool can be deployed through various conveyances, such as wireline, slickline, logging cable, or coiled tubing, and can be employed in multiple applications, such as in open-hole formation evaluation or well integrity monitoring in a cased-hole environment. The non-rotatable imaging tool is advantageously designed to produce an image log without rotating the tool. In addition, the non-rotatable imaging tool overcomes limitations imposed by the maximum tool diameter. In some embodiments, the non-rotatable imaging tool has an external diameter of $1^{11}/_{16}$" to enable operations within small wellbore tubulars, such as production tubing in a wellbore. Examples of the non-rotatable imaging tool, therefore, can have an external diameter that is no greater than one and eleven sixteenth of an inch ($1^{11}/_{16}$"). Thus, the disclosure provides an improved imaging tool that can be used without rotating the imaging tool and in locations having a limited diameter.

The source for the radiation detected by the non-rotatable imaging tool can be natural radioactivity, such as gamma rays, from a wellbore formation, from radioactive tracers inside the wellbore or behind casing, or from a radiation source within, for example, the tool. In some embodiments, the radiation source corresponds to the imaging data obtained and how the imaging data is used. For example, with natural gamma radioactivity, the imaging data can be used to look at radioactivity in subterranean formations to determine geological structures. With radioactive tracers, the imaging data can be used to determine the location, such as depth, of a well material introduced into the wellbore, such as a gravel pack, or determine the condition, such as fracture or deposition material, behind casing. A well material is a material added or injected to the well by, for example, the well operator. The well material can be, for example, material of various compositions, including cement (sometimes referred to as concrete), water, mud sediments, radioactive tag material, non-radioactive tag material, or proppants.

FIG. 1 illustrates a wireline system 100 configured to perform, for example, formation testing, sampling, or downhole imaging of a wellbore. Wireline system 100 may include a wireline tool 110 that forms part of a wireline logging operation that can include a non-rotatable imaging tool 120. Wireline system 100 may include a derrick 130 at the surface 104 that supports a traveling block 131, and the wireline tool 110, such as a probe or a sonde, may be lowered by a conveyance 133 into a wellbore 101 that extends into the earth 102. The wellbore 101 can include a multi-pipe configuration including a drill pipe and production tubing 105 with a limited diameter for inserting some tools, such as the non-rotatable imaging tool 120 or other logging tools that are based on nuclear measurement principles. The wireline tool 110 may be lowered to the bottom of a region of interest in the wellbore 101 and subsequently pulled upward at a substantially constant speed. Imaging data obtained from the imaging tool 120 can be communicated to a surface logging facility 140 for storage, processing, and/or analysis. Logging facility 140 may be provided with electronic equipment 144, including processors for various types of signal processing and communication of information. Wireline system 100 may further include a controller 160 that directs operation thereof and includes a processor 162 and a memory 164. A processor of the electronic equipment 144 or the controller 160 can be configured to perform the functions of the computer illustrated in FIG. 8, such as processing image data obtained from the non-rotatable imaging tool 120 to generate a 360 degree image for a particular depth of the wellbore 101.

Figure 2:
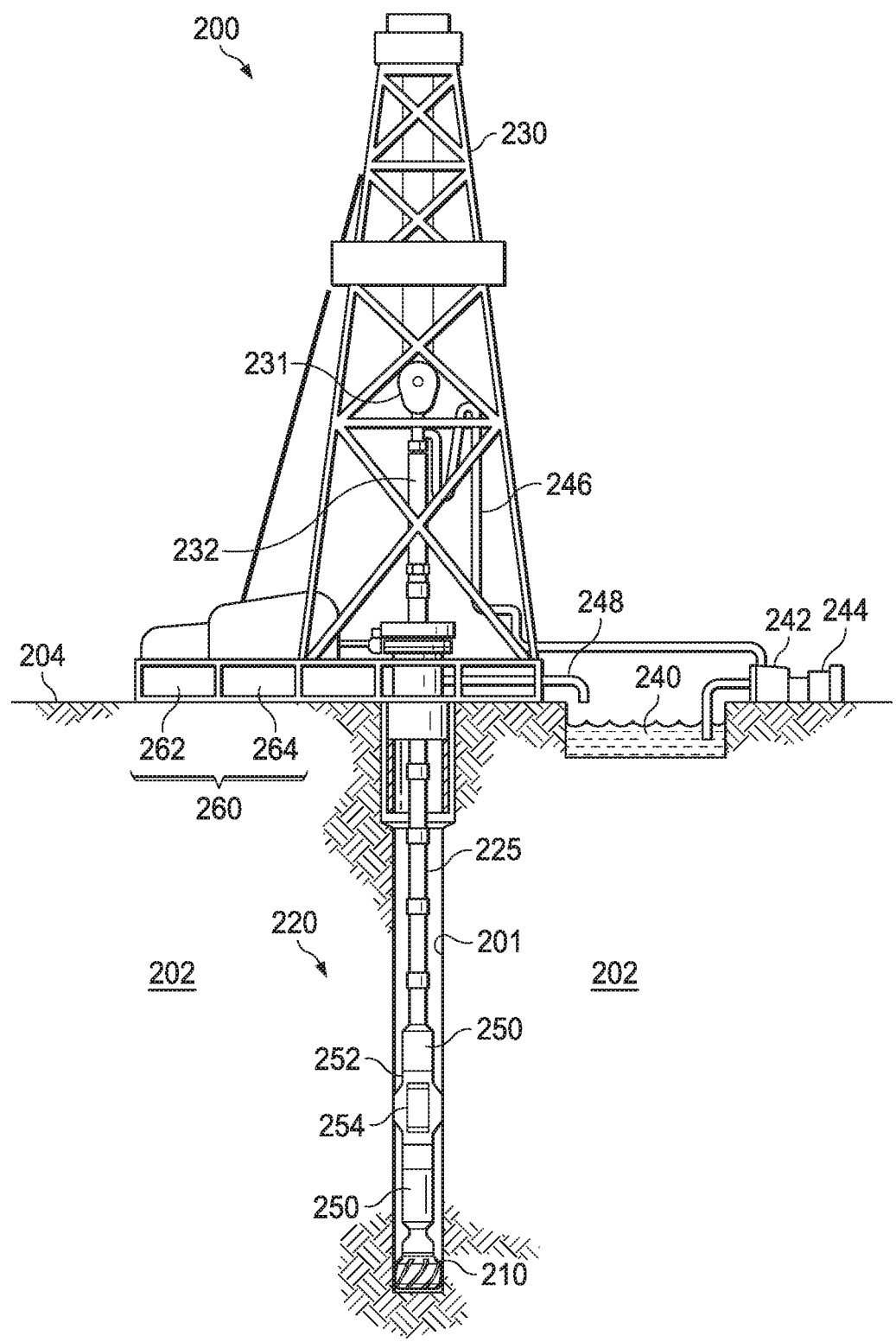
FIG. 2 illustrates a logging while drilling (LWD) system configured to perform formation drilling.

FIG. 2 illustrates a logging while drilling (LWD) system 200 configured to perform formation drilling. Wellbore 201 may be created by drilling into the earth 202 using a drill tool 210. LWD system 200 may be configured to drive bottom hole assembly (BHA) 220 positioned or otherwise arranged at the bottom of a drill string 225 extended into the earth 202 from a derrick 230 arranged at the surface 204. Derrick 230 includes a kelly 232 and a traveling block 231 used to lower and raise the kelly 232 and drill string 225.

Fluid or "drilling mud" from a mud tank 240 may be pumped downhole using a mud pump 242 powered by an adjacent power source, such as a prime mover or motor 244. The drilling mud may be pumped from mud tank 240, through a stand pipe 246, which feeds the drilling mud into drill string 225 and conveys the same to drill tool 210. The drilling mud exits one or more nozzles arranged in drill tool 210 and in the process cools drill tool 210. After exiting drill tool 210, the mud circulates back to the surface 204 via the annulus defined between the wellbore 201 and the drill string 225, and in the process, returns drill cuttings and debris to the surface. The cuttings and mud mixture are passed through a flow line 248 and are processed such that a cleaned mud is returned down hole through the stand pipe 246 once again.

BHA 220 includes the drill tool 210 that is operatively coupled to a tool string 250 which may be moved axially within wellbore 201. During operation, drill tool 210 penetrates the earth 202 and thereby creates wellbore 201. BHA 220 provides directional control of drill tool 210 as it advances into earth 202. Tool string 250 can be semi-permanently mounted with various measurement tools (not shown) such as, but not limited to, measurement-while-drilling (MWD) and logging-while-drilling (LWD) tools, that may be configured to take downhole measurements of drilling conditions. BHA 220 may further include an LWD tool 252 having a non-rotatable imaging tool 254 such as disclosed herein. LWD tool 252 may be positioned between drill string 225 and drill tool 210. In other embodiments, the measurement tools may be self-contained within drill string 225. The wireline tool 110 of FIG. 1 and the LWD tool 252 may be referred to as downhole tools.

A controller 260 including a processor 262 and a memory 264 may direct operation of the LWD system 200. A communication channel may be established by using electrical signals or mud pulse telemetry for most of the length of tool string 250 from drill tool 210 to controller 260. In some embodiments, controller 260 may receive information from non-rotatable imaging tool 254 via the communication channel. The controller 260 can be configured to perform the functions of the computer illustrated in FIG. 8.

The disclosed downhole image logging tool, such as non-rotatable imaging tools 120 and 254, is based on nuclear logging principles and uses a radiation detector or detectors. In one example, the non-rotatable imaging tool utilizes a gamma ray detector(s), for example, Geiger-Muller counters or scintillation detectors. When the non-rotatable imaging tool is designed as an active measurement instrument, the gamma ray detector or detectors measure the radiation scattered by the environment after being emitted from a radioactive source placed inside the imaging tool. When the imaging tool is designed as a passive measurement instrument, the gamma ray detector or detectors measure the radiation from the environment either naturally occurring or by dispersed radioactive tracers. Those two types of tool configurations, active and passive, can be seen in FIG. 3A and FIG. 3B.

FIG. 3A illustrates a diagram of a side view of an example of an active non-rotatable imaging tool 300 that measures radiation in a wellbore. In this example, the radiation is gamma rays. The non-rotatable active imaging tool 300 is based on the attenuation of gamma rays and includes an omnidirectional gamma source 310 that emits gamma rays toward the full circumference area of a wellbore.

In the illustrated example, the active non-rotatable imaging tool 300 is a three-detector configuration. The three detectors, first detector 320, second detector 322, and third detector 324, are placed at a pre-determined distance from the gamma source 310, and are collimated to detect gamma rays at a certain depth in a wellbore that are scattered from the wellbore, the metal piping within the wellbore, and well material behind the metal piping. The gamma source 310 and the three detectors 320, 322, 324, are located within a tool enclosure or body 330. The active imaging tool 300 also includes a barrier 340 that is located in the tool body 330 and between the gamma source 310 and the three detectors 320, 322, 324. The barrier 340 prevents the three detectors 320, 322, 324, from obtaining gamma rays scattered inside the tool body 330 directly from the gamma source 310. The barrier 340 is constructed of a dense metal that heavily attenuates gamma rays. Each of the gamma ray detectors 320, 322, 324, obtains gamma measurements by measuring the energy distribution of the number of photons deposited at the particular detector (count rates per second). As illustrated in FIG. 3A, each of the gamma ray detectors 320, 322, 324, are located on a different horizontal plane of the non-rotatable imaging tool 300 and located on or proximate a central axis of the imaging tool 300.

The active non-rotatable imaging tool 300 can include more or less than three gamma ray detectors. The greater number of gamma ray detectors that are located close to the gamma source 310 provide more details of the surrounding area proximate the active non-rotatable imaging tool 300. When there are more gamma ray detectors located distal from the gamma source 310, an increase in the details away from the active imaging tool 300 can be obtained.

The energy range applied with the active non-rotatable imaging tool 300 is generally below a few hundreds keV. For example, a source of Cs-137 has energy level of 662 keV. The elements encountered by the gamma rays in the downhole environment such as wellbores 101 or 201 have very similar attenuation coefficients, which in term stay relatively constant over the full energy range of interest. Therefore the total number of count rates measured is mainly determined by the density of materials that the gamma rays interact with along their path from the gamma source 310 to one of the gamma ray detectors 320, 322, 324. This is the nuclear measurement principle behind the gamma-gamma technique for the active non-rotatable imaging tool 300.

FIG. 3B illustrates a diagram of a side view of an example of a passive non-rotatable imaging tool 350 that measures radiation in a wellbore. In this example, the radiation is gamma rays. In the illustrated example, the passive non-rotatable imaging tool 350 is a three-detector configuration that includes a first detector 360, a second detector 362, and a third detector 364, that are located within a tool enclosure or body 370. As with the gamma ray detectors of the active non-rotatable imaging tool 300, each of the gamma ray detectors 360, 362, 364, obtains gamma measurements by measuring the energy distribution of the number of photons deposited at the particular detector (count rates per second). Instead of measuring radiation scattered by the environment after being emitted from a radioactive source inside of an imaging tool, the gamma ray detectors 360, 362, 364, of passive non-rotatable imaging tool 350 measure the radiation from the environment either naturally occurring or by dispersed radioactive tracers. As illustrated in FIG. 3B, each of the gamma ray detectors 360, 362, 364, are located on a different horizontal plane of the passive non-rotatable imaging tool 350 and located on or proximate a central axis thereof.

Whether employing an active or passive non-rotatable imaging tool, the disclosure recognizes that an image of a wellbore can be constructed with the information collected from a plurality of radiation detectors sensitive to different wellbore azimuthal sectors. A processor can be programmed to construct the wellbore image from the collected information. Advantageously, the disclosure provides a non-rotatable imaging tool with radiation detectors that are collimated toward different azimuthal angles and placed along a tool axis at predetermined distances. The tool axis is along a length of the imaging tool and can be the central axis of the imaging tool. Each of the detectors is well shielded except for one aperture facing a certain azimuthal angle that provides a single, unique azimuthal area. Depending on the azimuthal resolution requirement, there can be two, three, four or more detectors. The collimator aperture Ø can be consistent with the number of detectors N, Ø=360/N. For example, when there are two detectors in place, the collimator aperture for each detector can be 180 degree.

Figure 4A:
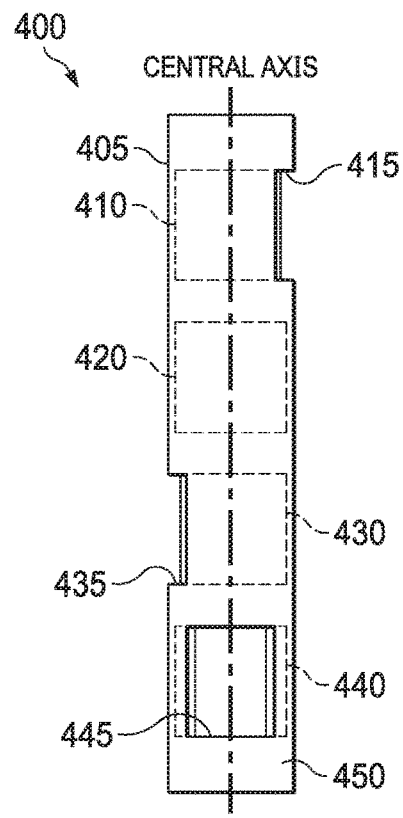
FIG. 4A illustrates an example of radiation detectors distributed along the central axis of a non-rotatable imaging tool.
Figure 4B:
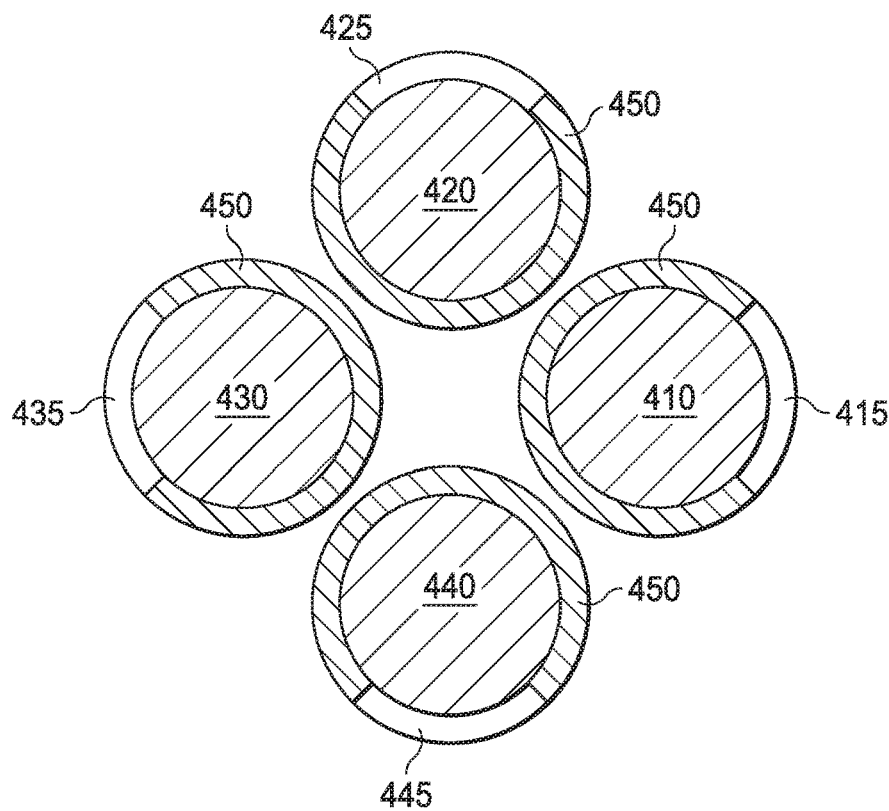
FIG. 4B illustrates a top view of each of the radiation detectors of the non-rotatable imaging tool of FIG. 4A.

FIG. 4A illustrates an example of radiation detectors distributed along the central axis of a non-rotatable imaging tool 400. In FIG. 4A, the non-rotatable imaging tool 400 is a passive imaging tool that does not include a radiation source. However, the non-rotatable imaging tool 400 can include a radiation source and operate as an active imaging tool. The non-rotatable imaging tool 400 includes four radiation detectors 410, 420, 430, 440, vertically stacked along the central axis of the non-rotatable imaging tool 400 and within a tool body 405. Each of the detectors 410, 420, 430, 440, is collimated with a 90 degree aperture. The aperture for the radiation detector 420 is not visible from the view of FIG. 4A. The visible apertures in FIG. 4A are 415, 435, and 445. FIG. 4B illustrates a top view of each of the radiation detectors 410, 420, 430, 440. FIG. 4B does not indicate a location of the detectors 410, 420, 430, 440, with respect to horizontal planes and the central axes of non-rotatable imaging tool 400 but provides a top view to show the location of the apertures and 360 coverage. When there are four radiation detectors in place such as in the non-rotatable imaging tool 400, the collimator apertures are spaced azimuthally and are each at 90 degrees to provide full circumferential coverage of a wellbore. For example, the orientation of each of the detectors 410, 420, 430, 440, allows the 90 degree collimator apertures 415, 425, 435, 445, to cover the full circumferential area of a wellbore. Since the detectors are placed at different vertical positions in the imaging tool 400, the measurement result from each of the detectors 410, 420, 430, 440, are aligned by depth and reconstructed to generate an image at the same depth of the wellbore. A processor can align or compensate for the image data from the vertically stacked radiation detectors to generate a 360 degree image for a particular depth of the wellbore. The computer of FIG. 8 can perform the compensation. Additionally, a processor of the electronic equipment 144 or the controllers 160, 260, can be configured to perform the functions of the computer illustrated in FIG. 8.

To reduce the radiation from unwanted directions, such as unwanted gamma radiation, the imaging tool 400 includes sufficiently thick shielding 450 around the detectors 410, 420, 430, 440. The shielding material can be made of tungsten or lead. The thickness of the shielding material 450 can be designed to ensure a high front to back ratio regarding count rates measured at each of the detectors 410, 420, 430, 440. The thickness of the shielding material 450 can vary and is a trade-off between the diameter of a detector, such as detectors 410, 420, 430, 440, and the available space inside an imaging tool, such as imaging tool 400. For example, the thickness of the shielding material 450 can be one half inch (½ inch) or greater depending on the imaging tool diameter and the detector diameter. The apertures 415, 425, 435, and 445, can be open or filled with low-density materials, such as titanium or beryllium alloys. Placing the detectors 410, 420, 430, 440 along the central axis provides an advantage of better detector shielding, and hence better azimuthal resolution.

Figure 8:
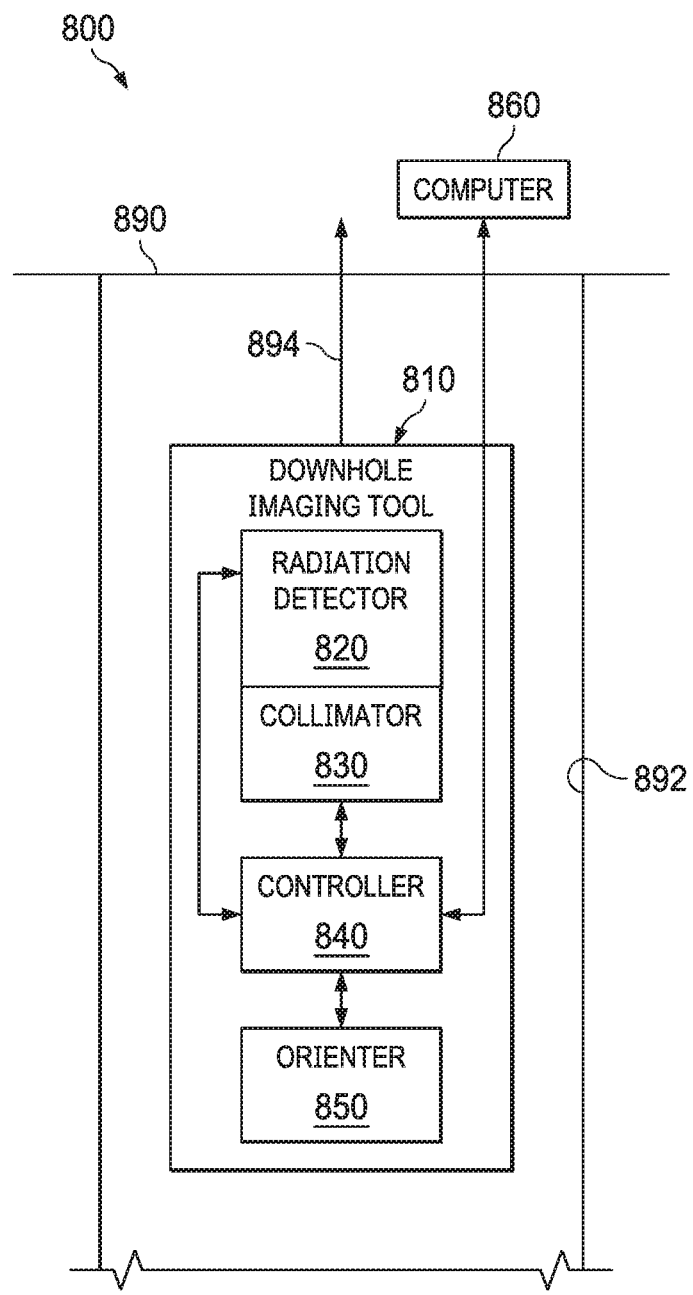
FIG. 8 illustrates an example of an imaging system employing a non-rotatable imaging tool for downhole imaging.

An orienter, such as an inclinometer/compass assembly can be included in the imaging tool 400 and used to orient the produced images with respect to a reference such as magnetic north. An orienter, such as illustrated in FIG. 8, provides a fixed reference and overcomes a variable frame of reference which would otherwise occur as a consequence of the natural rotation of the tool caused by torque relief in the conveyor when the tool is lowered into or removed from the wellbore.

Figure 5A:
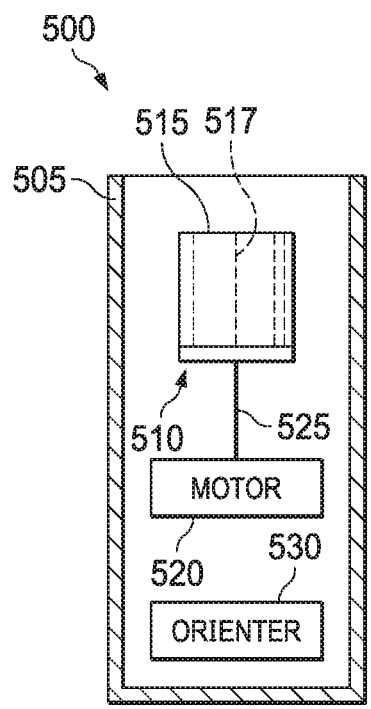
FIG. 5A illustrates an example of a non-rotatable imaging tool that includes a rotating collimator.

FIG. 5A illustrates an example of a non-rotatable imaging tool 500 that includes a rotating collimator 510 within a tool body 505. As shown in FIG. 5A, a radiation detector 515 is enclosed inside the rotating collimator 510, which can be made of dense, gamma ray absorbing material, such as tungsten or lead. The rotating collimator 510 creates collimation by opening an aperture 517 inside the rotating collimator 510 that provides an exposure area to the radiation detector 515. The aperture 517 can be open or filled with low-density material. The low-density material can be an alloy of titanium or beryllium and provide mechanical strength to the rotating collimator 510. The size of the aperture 517 is designed to suit the required azimuthal resolution.

A motor 520 is affixed to the rotating collimator 510 by, for example, a shaft 525. The motor 520 can be a conventional motor appropriately sized to fit within the non-rotatable imaging tool 500 and rotate the rotating collimator 510. The radiation detector 515 is inserted inside the rotating collimator 510 and remains stationary to the tool axis of the imaging tool 500. The rotating collimator 510 is rotated to create different exposure areas in the azimuthal direction of the aperture 517. The angular position of the aperture 517 is determined by the rotating speed (RPM) of the rotating collimator 510 as rotated by the motor 520. The count rates from each angular position can be binned to generate a map of count rates at different angular directions. A processor can be programmed to orient the resulting image to a reference direction with the aid of an incorporated orienter 530, such as an inclinometer, as previously described. An example of this type of rotating collimator is provided in FIG. 6B and discussed below.

Figure 5B:
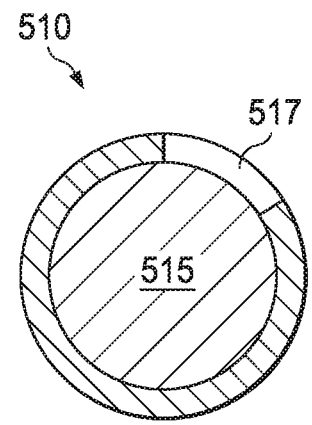
FIG. 5B illustrates a top view of the rotating collimator of the non-rotatable imaging tool of FIG. 5A with respect to the radiation detector and the aperture thereof.

In another example, the radiation detector 515 is inserted into the rotating collimator 510 and is rotated with the aperture 517 to create different exposure areas in the azimuthal direction. In this example, the non-rotatable imaging tool 500 further includes a rotating brush and collector system (not illustrated) to connect the radiation detector 515 to its associated electronics. The angular position of the collimator aperture 517 is determined by the rotating speed (RPM). The count rates from each angular position can be binned to generate a map of count rates at different angular directions. A processor can be programmed to orient the resulting image to a reference direction with the aid of the orienter 530. An example of this type of rotating collimator is provided in FIG. 6A and discussed below. FIG. 5B illustrates a top view of the rotating collimator 510 with respect to the radiation detector 515 and the aperture 517.

Figure 6A:
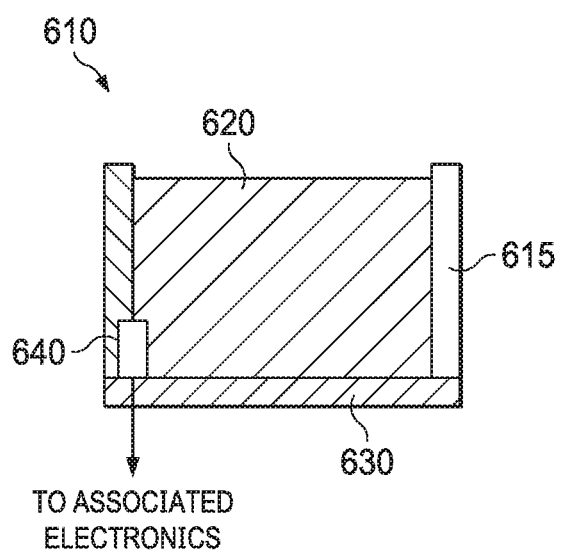
FIG. 6A and FIG. 6B illustrate two different examples of a design of a rotating collimator.
Figure 6B:
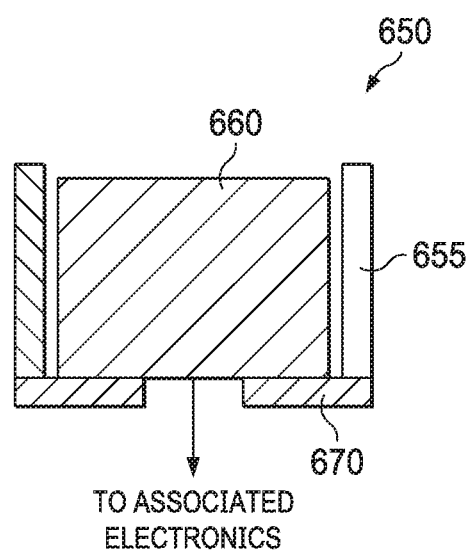

FIG. 6A and FIG. 6B illustrate two different examples of a design of a rotating collimator, rotating collimator 610 and rotating collimator 650, discussed above with respect to FIG. 5A. The rotating collimator 610 includes an aperture 615 and the rotating collimator 650 includes an aperture 655. In FIG. 6A, a radiation detector 620 is fixed to a bottom plate 630 of the rotating collimator 610 and both are rotated around a central axis of a non-rotatable imaging tool when obtaining measurements. A rotating brush and collector system 640 can be used to connect the radiation detector 620 to its associated electronics. The associated electronics are configured to receive the radiation measurements from the radiation detector 620 and provide them to a processor or controller for image processing. In FIG. 6B the rotating collimator 650 rotates around a fixed, non-rotating detector 660. An opening in a bottom plate 670 of the rotating collimator 650 allows for the passage of electric connections between the non-rotating detector 660 and associated electronics.

Figure 7:
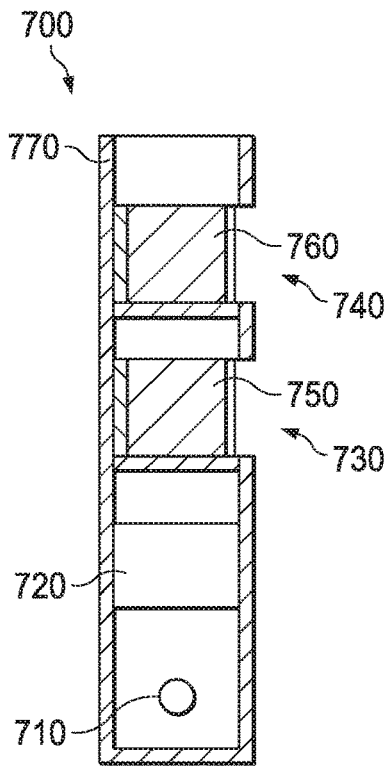
FIG. 7 illustrates a diagram of another example of a non-rotatable imaging tool.

FIG. 7 illustrates a diagram of another example of a non-rotatable imaging tool 700. The non-rotatable imaging tool 700 illustrates an example of a downhole imaging tool with two radiation detectors equipped with rotating collimators respectively for obtaining imaging measurements. The non-rotatable imaging tool 700 is an active tool that includes a radiation source 710, a barrier 720, two rotating collimators 730, 740, and two radiation detectors 750, 760, located within a tool body 770. The rotating collimators 730 or 740 can be one of the rotating collimators of FIG. 5A, FIG. 6A, or FIG. 6B. The non-rotatable imaging tool 700 provides another example of a method to construct a wellbore image by collecting information from a plurality of radiation detectors that are each equipped with a rotating collimator. Having at least one more radiation detector in the non-rotatable imaging tool 700 provides a capability to compensate for an adverse wellbore environment effect in the measurements of each radiation detector, such as heavy mud, stand-off, irregular wellbore size, etc. Synchronizing the rotation of the collimator packages for all radiation detectors, provides a compensated imaging measurement. This design is particularly useful when used to generate a density image with a non-rotatable imaging tool. A processor, controller or computer, such as discussed in FIG. 8 can be configured to perform the processing of the collected information from the radiation detectors.

FIG. 8 illustrates an example of an imaging system 800 employing a non-rotatable imaging tool for downhole imaging as disclosed herein. The imaging system 800 includes a non-rotatable imaging tool 810 and a computer 860. The non-rotatable imaging tool 810 includes a radiation detector 820, such as a gamma ray detector, a collimator 830, a controller 840, and an orienter 850. In the illustrated example, a single radiation detector and collimator are illustrated. In other examples, the non-rotatable imaging tool 810 can include multiple radiation detectors and can also include multiple collimators, such as illustrated and discussed herein. The computer 860 is located at the surface 890 of a wellbore 892 and receives information from the non-rotatable imaging tool 810 via a communication channel. The communication channel can be a conventional one typically employed in wellbores. The computer 860 can include a display to visually provide processed images of the wellbore 892 or formation around the wellbore 892 based on the radioactive measurements obtained by the radiation detector 820. In another example, the computer 860 can be located in the non-rotatable imaging tool 810 and communicate the processed images up hole via the communication channel or store the processed images for download once the non-rotatable imaging tool 810 is at the surface 890. The computer 860 can include a memory to store the retrieved image data and a processor for processing once the image data is downloaded at the surface 890 or received from downhole. The computer 860 can include a communications interface to transmit and receive data via the communication channel. The computer 860 or processing circuitry for processing the image data can be in the controller 840. The processing can include orienting the resulting image to a reference direction with the aid of the orienter 850. The processing can also include aligning measurement results from multiple detectors placed at different vertical positions in a non-rotatable imaging tool. The images can be aligned by depth and reconstructed to generate an image at the same depth of the wellbore. Thus, the computer 860 can align or compensate for the image data from vertically stacked radiation detectors to generate a 360 degree image for a particular depth of the wellbore 892. The processing can depend on the type of configuration of the radiation detectors and collimators.

The controller 840 can direct the operation of the radiation detector 820 and the collimator 830. The controller 840 can control a motor (not illustrated) to rotate the collimator 830 when the collimator is a rotating collimator. The controller 840 can also include electronics associated with the radiation detector 820 that receives the imaging data therefrom. With a rotating collimator, the controller 840 can receive the imaging data via a rotating brush and collector system. Instead of a rotating collimator, the collimator 830 can be a fixed collimator.

The orienter 850 provides a fixed reference and overcomes a variable frame of reference which, for example, could occur as a consequence of the natural rotation of the tool caused by torque relief in a conveyor 894 when the non-rotatable imaging tool 810 is lowered into or removed from the wellbore 892. The orienter 850 can be used to orient the produced images from the radioactive measurements with respect to a reference such as magnetic north. The orienter 850 can be an inclinometer or a compass assembly. The radiation detector 820, the collimator 830, and the orienter 850 can be one of the various detectors, collimators, and orienters disclosed herein.

The disclosure provides a downhole apparatus to generate imaging logs that does not require the rotation of a tool or an azimuthal distribution of sensors. The disclosed non-rotatable imaging tool advantageously operates in wellbores that have a strict limitation of outer diameter.

The non-rotatable imaging tool can create azimuthal sensitivity by using a rotatable collimator or a plurality of detectors placed at different longitudinal distances through depth alignment. This non-rotatable imaging tool provides improved counting statistics due to allowing a larger crystal size for the radiation detectors. The non-rotatable imaging tool also has improved azimuthal sensitivity because of the creation of more space for shielding to block unwanted signals other than from the aperture. The non-rotatable imaging tool can be a passive tool that works without its own radiation source or an active tool that works with its own radiation source. A radiation detector or detectors are used to count scattered radiation rays, such as gamma rays, from whichever source.

The various features of different examples of the tool include a radiation source (active or passive), a radiation detector at one location along the longitudinal direction, wherein the radiation detector is partially shielded, and rotated collimation for some of the examples provided herein. The tool can achieve azimuthal sensitivity by using a rotatable detector or collimator.

Figure 9:
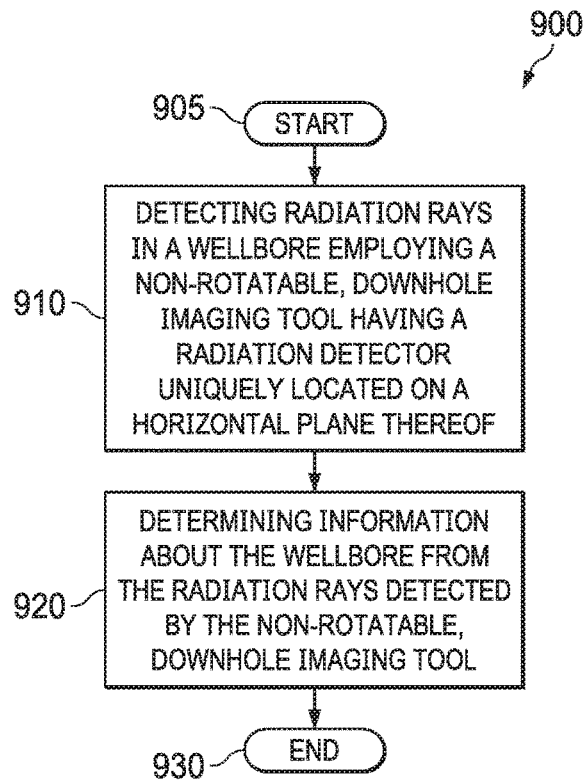
FIG. 9 illustrates a flow diagram of an example of a method for determining information of a wellbore employing a non-rotatable imaging tool.

The disclosed tool, system and method can find application in small wellbore imaging. For example, through tubing cement evaluation, small wellbore density logging, or small wellbore gamma ray logging, or through tubing well integrity logging. The non-rotatable imaging tools provided herein can be employed in various methods to gather imaging data from within a wellbore; including wellbores or tubing within a wellbore having a limited diameter. FIG. 9 illustrates a flow diagram of an example of a method 900 for determining information associated with a wellbore employing a non-rotatable imaging tool as disclosed herein. The information can be from imaging data gathered from within the wellbore by the non-rotatable imaging tool. The method 900 begins in a step 905.

In a step 910 radiation rays are detected in the wellbore employing a non-rotatable, downhole imaging tool having a radiation detector uniquely located on a horizontal plane thereof. The non-rotatable imaging tool can be one of the non-rotatable imaging tools disclosed herein. The radiation rays can be gamma rays and the source of the radiation rays can be radioactivity in subterranean formations. In some examples the radiation source is inside the tool. In other examples the source of the radiation is radioactive tracers included within a well material introduced into the wellbore.

In a step 920, information about the wellbore is determined from the radiation rays detected by the non-rotatable, downhole imaging tool. The information can be determined by processing images obtained from the detected radiation rays. The processed images can indicate geological structures associated with the subterranean formations proximate the wellbore. In another example, the information can indicate a location of well material introduced into the wellbore wherein the well material is non-radioactive tracers. The information can also indicate a condition of the wellbore behind casing in the wellbore. The method 900 ends in a step 930.

Those skilled in the art to which this application relates will appreciate that other and further additions, deletions, substitutions and modifications may be made to the described embodiments.

The above-described apparatuses, systems or methods or at least a portion thereof may be embodied in or performed by various processors, such as digital data processors or computers, wherein the processors are programmed or store executable programs or sequences of software instructions to perform one or more of the steps of the methods or functions of the apparatuses or systems. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain embodiments disclosed herein or features thereof may further relate to computer storage products with a non-transitory computer-readable medium that has program code thereon for performing various computer-implemented operations that embody at least part of the apparatuses, the systems, or to carry out or direct at least some of the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Various aspects of the disclosure can be claimed including the apparatuses, systems, and methods disclosed herein. Aspects disclosed herein include:

A. A non-rotatable, downhole imaging tool having a central axis and horizontal planes perpendicular to the central axis, the downhole imaging tool comprising: (1) a radiation detector positioned proximate the central axis and uniquely on one of the horizontal planes, and (2) a collimator configured to limit exposure of the radiation detector to a single azimuthal area along a circumference of the downhole imaging tool on the one of the horizontal planes.

B. An imaging system for a wellbore, including: (1) a non-rotatable, downhole imaging tool having a central axis and horizontal planes perpendicular to the central axis, the downhole imaging tool having: (1A) a radiation detector positioned proximate the central axis and uniquely on one of the horizontal planes, and (1B) a collimator configured to limit exposure of the radiation detector to a single azimuthal area along a circumference of the downhole imaging tool on the one of the horizontal planes, and (2) a computer configured to generate an image for a particular depth of the wellbore by processing images from radiation measurements obtained by the radiation detector.

C. A method of determining geological structures proximate a wellbore, including: (1) detecting gamma rays in the wellbore employing a non-rotatable, downhole imaging tool having a gamma ray detector uniquely located on a horizontal plane thereof, wherein a source of the gamma rays is radioactivity in subterranean formations, and (2) determining geological structures associated with the subterranean formations from the gamma rays detected by the gamma ray detector.

D. A method of determining a location of a well material introduced into a wellbore, including: detecting radiation rays in the wellbore employing a non-rotatable, downhole imaging tool having a radiation detector uniquely located on a horizontal plane thereof, wherein a source of the radiation rays is emitted from a radiation source inside the tool and the well material is non-radioactive tracers introduced into the wellbore, and (2) determining a location of the well material within the wellbore from the radiation rays detected by the radiation detector.

E. A method of determining a condition of a wellbore having casing, including: (1) detecting gamma rays in the wellbore employing a non-rotatable, downhole imaging tool having a gamma ray detector uniquely located on a horizontal plane thereof, wherein a source of the gamma rays is radioactive tracers included within a well material introduced into the wellbore, and (2) determining a condition of the wellbore behind the casing from the detected gamma rays.

Each of aspects A, B, C, D, and E can have one or more of the following additional elements in combination:

Element 1: further comprising multiple radiation detectors, wherein each of the radiation detectors is located on a different one of the horizontal planes. Element 2: wherein the collimator is a rotating collimator that is configured to create unique azimuthal areas along the circumference for exposure to the radiation detector at different times. Element 3: wherein the rotating collimator rotates independent of the radiation detector. Element 4: wherein the rotating collimator and the radiation detector rotate together. Element 5: further comprising multiple radiation detectors and multiple collimators that correspond to the radiation detectors and limit exposure of each of the radiation detectors to a unique azimuthal area along the circumference. Element 6: wherein the multiple collimators are rotating collimators. Element 7: wherein each of the multiple collimators includes an aperture that is employed to limit the exposure of the corresponding radiation detectors to the unique azimuthal area. Element 8: wherein a size of the apertures correspond to a number of the multiple radiation detectors. Element 9: further comprising a radiation source and a radiation barrier. Element 10: further comprising an orienter configured to provide a fixed reference to align measurements obtained by the radiation detector. Element 11: further comprising a motor operable to rotate the collimator within the non-rotatable, downhole imaging tool when obtaining measurements by the radiation detector and a memory configured to store the measurements. Element 12: wherein an external diameter of the non-rotatable imaging tool is no greater than one and eleven sixteenth of an inch ($1^{11}/_{16}''$). Element 13: wherein the radiation rays are gamma rays and the radiation source is a gamma ray source. Element 14: wherein the radiation source arises from a capture of thermalized neutrons emitted from a neutron source inside the tool. Element 15: wherein a condition of the wellbore behind the casing is a fracture.

What is claimed is:

1. A non-rotatable, downhole imaging tool having a central axis and horizontal planes perpendicular to the central axis, the downhole imaging tool comprising:
   a radiation detector positioned proximate the central axis and uniquely on one of the horizontal planes; and
   a collimator configured to limit exposure of the radiation detector to a single azimuthal area along a circumference of the downhole imaging tool on a horizontal plane that corresponds to the one of the horizontal planes of the radiation detector.

2. The non-rotatable, downhole imaging tool as recited in claim 1 further comprising multiple radiation detectors, wherein each of the radiation detectors is located on a different one of the horizontal planes.

3. The non-rotatable, downhole imaging tool as recited in claim 2, further comprising an orienter configured to provide a fixed reference to align measurements obtained by the radiation detectors.

4. The non-rotatable, downhole imaging tool as recited in claim 1 wherein the collimator is a rotating collimator that is configured to create unique azimuthal areas along the circumference for exposure to the radiation detector at different times.

5. The non-rotatable, downhole imaging tool as recited in claim 4, wherein the rotating collimator rotates independent of the radiation detector.

6. The non-rotatable, downhole imaging tool as recited in claim 4, wherein the rotating collimator and the radiation detector rotate together.

7. The non-rotatable, downhole imaging tool as recited in claim 4, further comprising a motor operable to rotate the collimator within the non-rotatable, downhole imaging tool when obtaining measurements by the radiation detector, and a memory configured to store the measurements.

8. The non-rotatable, downhole imaging tool as recited in claim 1 further comprising multiple radiation detectors and multiple collimators that correspond to the radiation detectors and limit exposure of each of the radiation detectors to a unique azimuthal area along the circumference.

9. The non-rotatable, downhole imaging tool as recited in claim 8 wherein each of the multiple collimators includes an aperture that is employed to limit the exposure of the corresponding radiation detectors to the unique azimuthal area.

10. The non-rotatable, downhole imaging tool as recited in claim 9 wherein a size of the apertures correspond to a number of the multiple radiation detectors.

11. The non-rotatable, downhole imaging tool as recited in claim 8 wherein each of the multiple collimators is a rotating collimator.

12. The non-rotatable, downhole imaging tool as recited in claim 1, further comprising a radiation source and a radiation barrier.

13. The non-rotatable, downhole imaging tool as recited in claim 1, wherein an external diameter of the non-rotatable imaging tool is no greater than one and eleven sixteenth of an inch (1 11/16").

14. An imaging system for a wellbore, comprising:
a non-rotatable, downhole imaging tool having a central axis and horizontal planes perpendicular to the central axis, the downhole imaging tool including:
a radiation detector positioned proximate the central axis and uniquely on one of the horizontal planes, and
a collimator configured to limit exposure of the radiation detector to a single azimuthal area along a circumference of the downhole imaging tool on a horizontal plane that corresponds to the one of the horizontal planes of the radiation detector; and
a computer configured to generate an image for a particular depth of the wellbore by processing images from radiation measurements obtained by the radiation detector.

15. A method of determining geological structures proximate a wellbore, comprising:
detecting gamma rays in the wellbore employing a non-rotatable, downhole imaging tool having a gamma ray detector uniquely located on a horizontal plane thereof, wherein a source of the gamma rays is radioactivity in subterranean formations that corresponds to the horizontal plane; and
determining geological structures associated with the subterranean formations from the gamma rays detected by the gamma ray detector.

16. A method of determining a location of a well material introduced into a wellbore, comprising:
detecting radiation rays in the wellbore employing a non-rotatable, downhole imaging tool having a radiation detector uniquely located on a horizontal plane thereof, wherein a source of the radiation rays is emitted from a radiation source inside the tool and the well material is non-radioactive tracers introduced into the wellbore; and
determining a location of the well material within the wellbore from the radiation rays detected by the radiation detector.

17. The method as recited in claim 16 wherein the radiation rays are gamma rays and the radiation source is a gamma ray source.

18. The method as recited in claim 16 wherein the radiation source arises from a capture of thermalized neutrons emitted from a neutron source inside the tool.

19. A method of determining a condition of a wellbore having casing, comprising:
detecting gamma rays in the wellbore employing a non-rotatable, downhole imaging tool having a gamma ray detector uniquely located on a horizontal plane thereof, wherein a source of the gamma rays is radioactive tracers included within a well material introduced into the wellbore; and
determining a condition of the wellbore behind the casing from the detected gamma rays.

20. The method as recited in claim 19 wherein the condition is a fracture.

* * * * *